Figures 1, 2:
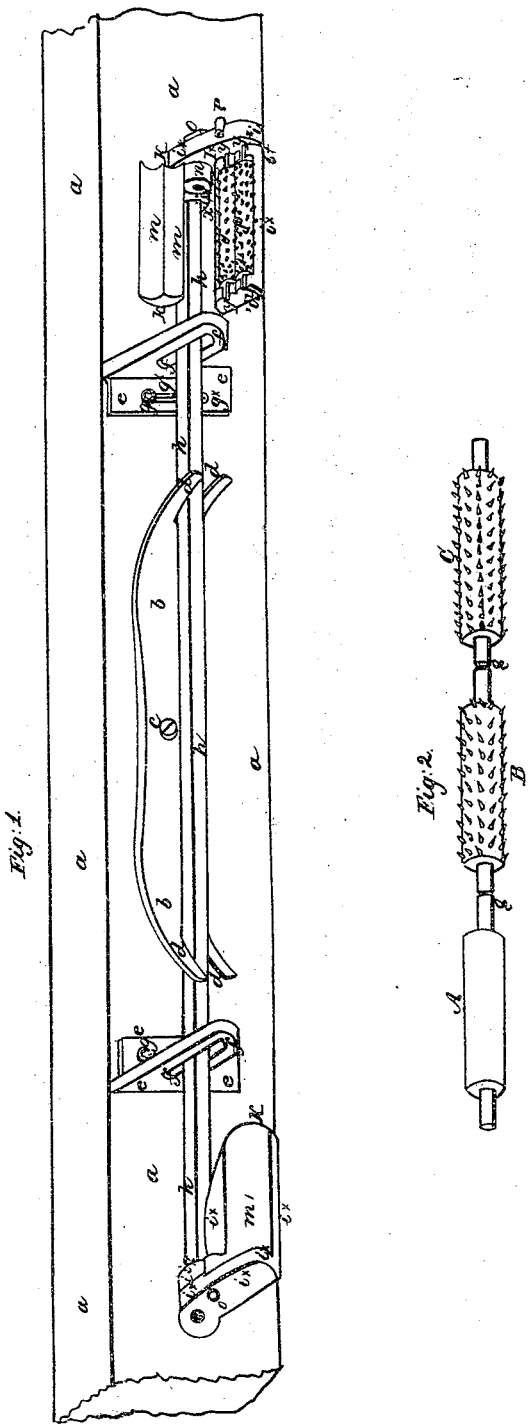

J. Smith.
Temple for Looms.

Nº 13413.   Patented Aug 7. 1855.

UNITED STATES PATENT OFFICE.

JAMES SMITH, OF LAUREL, MARYLAND, ASSIGNOR TO SMITH & BOTTERILL.

IMPROVEMENT IN TEMPLES FOR LOOMS.

Specification forming part of Letters Patent No. 13,413, dated August 7, 1855.

*To all whom it may concern:*

Be it known that I, JAMES SMITH, a native of the Kingdom of Great Britain, but having formally declared my intention to become a citizen of the United States of America, and having resided for the past twelve months preceding the date given in my petition accompanying herewith and now a resident of Laurel, in the county of Prince George's and State of Maryland, have invented and made certain new and useful Improvements in Temples for Looms; and I do hereby declare that the following is a full, clear, and exact description of the method of construction and mode of operating the same, reference being had to the accompanying drawings, making a part of this specification, in which—

Figure 1 shows the temple complete attached to the breast-beam $a\ a\ a\ a$ of the loom; $b\ b$, a semi-elliptical spring attached to breast-beam by a screw $c$; $d\ d\ d$, slotted or forked rest ends. $e\ e\ e\ e$ are brackets with slotted rest places $f\ f$; $g$ tightening-screws which confine the brackets through the adjusting-slots $g^\times\ g^\times$; $h\ h\ h\ h$, the flexible connection-rod or yielding bar; I I† I† I† I† I$^\times$ I$^\times$ II$^\times$ II$^\times$, the temple-shell; J J J J, the burred rollers; $k\ k$ $m\ m^\times\ m$, convex and concave falling or hinged cap; $n$, the hinged joint to the falling cap, with pivot bolt or screw $o$.  $p$ is a holdfast-button.

Fig. 2 shows the full size and appearance of the temple-rollers; A, the plain turned cylinder; B, the irregular burr-roller; C, the perfectly-formed conical pointed tooth or pin roller; $g\ g\ g\ g$, the journals or ends of the rollers.

To enable others to be skilled in the construction, use, and application of my improved temple, I will proceed to describe the same, the construction thereof being as follows, viz: I first take lengths of rod metal, say about one-half or five-eigths inch diameter and about four and one-half inches in length, dividing them into two equal-sized rollers, each roller formed with a journal end one-half inch long and about three-sixteenths of an inch diameter. These rollers are made true and smooth by turning them in a lathe. Next I take the plain rollers thus formed in pairs, as at A, Fig. 2, and having a suitable rest-place device to answer the purpose of holding one of the rollers at one time, being confined by the journals $g\ g$ to admit of its turning with ease in its place. Then having a tapering half-oval tool or cutter, Fig. 3, I take the tool or cutter in my left hand and use it somewhat in the manner of file cutting, and striking it with a hammer at proper intervals and with required regularity thus raise or strike up a burr, and thus forming a series of parallel rows the length of the rollers. Having completed the required number of the burr-rollers, as shown at Fig. 2, B, I next proceed to form up the irregular burrs into the conically-shaped teeth or pins through means of a delicately-shaped countersunken tool or punch, Fig. 4, with tapering end and pin-former V. This tool or teeth-forming device is held in the left hand, and by its aid and shape and by striking it with gentle quick blows the irregular burrs of the roller B are changed in form and become a uniformly-shaped conical and well pointed pin or tooth, as shown in Fig. 2 at C. These teeth or pins may be inclined obliquely across the surface of the roller, as well as in a longitudinal direction. This inclining of the pins or teeth is most essential. Having these toothed rollers constructed, next is formed of desired pattern, of brass, iron, or any other suitable material, what may be termed the "shell" or "case" for the rollers, as shown at I† I†, formed with a head part I* and a heel attachment I I*. This case has a hinged or falling cap $m$† K of an oval or flat form of top and concaves $m\ m$ on the inner side, so as to conform to the shape of the rollers J J J J, Fig. 1, and B C, Fig. 2. This cap $m$ may be attached to the head of the temple I* I* I* by a knuckle-joint or hinge $n$, confined or held in its place by a bolt, screw, or pin $o$, Fig. 1. This temple case or shell, with its head, may be about two and one-half to three inches long and about one and one-half inch wide across the shell part. The head being sufficiently long to allow for the attaching to the flexible rod $h\ h$, the case or shell part I† I† is formed with end rests and journal-boxes or rest places $y\ y\ y\ y$, in which the ends of the pin-rollers rest and revolve. The temple-shell should be made neatly and sufficiently light, with required strength, having longitudinal depressions or concavities sufficiently large to admit the rollers J J J J to revolve in. These concavities may be termed the "beds" of the rollers J J J J, two of which are used in the manufacture of heavy cloth or coarse fabrics. In such cases the temple is called a "double" or "twin" temple. In light fabrics a single-roller temple is used. In depositing the rollers in their bed places it is required that the pins should point outward from the center of the loom, so that the cloth is held or stretched outward.

Having the temple shell or case and rollers completed, the temples are attached to the ends of a yielding bar or flexible rod $h\ h\ h\ h$ of sufficient length to suit the width of cloth or the loom. This rod $h\ h\ h\ h$ need not be over one-fourth inch in diameter, or it may be flat or round, if desired. The temples must be arranged or attached to this rod or bar at such distances as to admit of the cloth passing its full width through the temples. The drawings represent the temples attached to the bar immediately at the ends of the rod, though the rod may pass three or four inches through the heel of the temple-head, if necessary. The temples, as will be perceived by reference to the drawings, are right and left—that is, they point inward toward each other.

The temples are connected to the loom through means of devices termed "brackets" $e\ e\ e\ e$, formed with slotted rest-places $f\ f\ f\ f$, and attached to the breast-beam of the loom $a\ a\ a\ a$ by means of a set-screw $g$, working in an adjusting-slot $g^x\ g^x$. These slotted adjusting-brackets are arranged near to the ends of the rod $h\ h\ h\ h$ either on the inner or outer sides of the temples, or at any suitable position, so as not to interfere with the beating up of the lay or reed beam.

In order the more to complete the temple, a semi-elliptical or suitable spring of flat thin metal $b\ b\ b\ b$ about twelve inches long and an inch wide is attached to the breast-beams by a screw or equivalent C. The ends of this spring are formed with forks or slots $d\ d\ d\ d$, into which works the yielding rod or temple-bar $h\ h\ h\ h$. This spring should have its ends turned outward sufficiently front so as to accommodate the rod $h\ h$ and support it securely and afford a uniform yielding action as the lay or reed beam beats up.

It may be well enough to observe that the temples can be connected to the breast-beam of the loom by a single bracket or any equivalent device or rest clasping or holding the flexible rod in its center.

*Application of the temple.*—The temples being attached to the loom, as hereinbefore described, and their position being such as to suit the width of the woven material, the cloth is passed over the surface of the rollers and the cap shut down thereon and held in its place by the small button or holder $p$, Fig. 1. The pins of the rollers J J J J stick into the cloth slightly, and as they are inclined outward from the center of the cloth the cloth is stretched and held uniformly, and as the rollers revolve in the movement of the cloth as it passes out and over the cloth-cylinder of the loom the cloth very readily is detached or relieved from the pins or teeth without in the least snagging or tearing the woven material, and owing to the uniformity of action the cloth is of a uniform and regular width, with even selvage or list edges, owing to the regular outward stretching of the rollers.

The advantages over all other temples possessed by my improved solid raised conical-pin falling-cap temple are many: first, simplicity and durability of construction of the roller by forming thereon, as described, a solid fixed or raised conical pin or tooth, thereby giving great durability and most readily overcoming the possibility of getting loosened and detached, as is the case with the wooden rollers; secondly, should one of the solid raised pins be broken or bent or blunted, all that is necessary is to take the burr-tool, Fig. 3, and the tooth or pin former, Fig. 4, and strike up a new pin; thirdly, my temple case or shell being hinged or jointed and detachable is readily lifted, when required, which admits of getting at the rollers in the event of the bending or twisting of the pin; fourthly, my temple being attached to the extremities of a flexible or yielding bar or rod and at the same time pressing up against a spring, as at $b\ b\ b$ C $d\ d\ d$, Fig. 1, admits of easing off the lay beat, and, reacting, returns the temple to its proper position. By this feature of yielding against the stroke or pressure of the lay or reed beam the usual jar or concussion of the lay is counteracted, and thus a uniform action and good result are brought about. Besides, too, the texture of the cloth is more of an equality than cloth produced through other temples.

The utility of my temple has been fully tested during the past six or eight months, and wherever my devices are used they are pronounced as most superior to all others known for the same purpose.

The cost of my improved temple is less than many of those in use, and as they are simple of construction and most substantial in their use are now being readily sought after.

It may be well enough to remark that a pair of my temples can be used as well for fine as for coarser cloth, merely requiring the closer pressure of the cap in the finer or thinner woven material, and, generally, the mere weight of the cap is sufficient to make the teeth or pins of the rollers hold to the fibers of the cloth without endangering the slipping off of the cloth in its passage out from over the rollers.

Deeming it unnecessary to enter more into detail of the general construction and utility of my improved temple for looms, and having described it in as clear and practical a manner as possible, and showing the many advantages thereof, what I claim as new and original with myself, and desire to secure by Letters Patent of the United States, is herewith set forth.

I am fully aware that burrs toothed and serrated surfaces have been formed for many purposes, and knowing that a variety of wooden rollers with pins inserted have been used for temples, I wish, however, to be understood as disclaiming such devices, and instead confine myself solely to the following distinguishing devices.

What I claim as my invention, and desire to secure by Letters Patent, is—

The temple-roller formed with solid raised conical-shaped pin-teeth, having a hinged cap to its case, all attached to a flexible rod $h\ h\ h\ h$, in combination with the forked spring $c\ d\ d\ d\ d$, when adjustable in brackets $e\ e\ e\ e\ f\ f\ f\ f\ g^\times\ g^\times$, the whole arranged substantially in the manner described and constituting my improved temple.

JAMES SMITH. [L. S.]

Witnesses:
ROBERT H. HARRISON,
WILBER W. HEATH.